(12) United States Patent
Hong et al.

(10) Patent No.: US 7,702,153 B2
(45) Date of Patent: Apr. 20, 2010

(54) SYSTEMS AND METHODS FOR SEGMENTING OBJECT OF INTEREST FROM MEDICAL IMAGE

(75) Inventors: Lin Hong, Monmouth Junction, NJ (US); Hong Shen, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 870 days.

(21) Appl. No.: 11/537,673

(22) Filed: Oct. 2, 2006

(65) Prior Publication Data

US 2007/0081710 A1 Apr. 12, 2007

Related U.S. Application Data

(60) Provisional application No. 60/724,445, filed on Oct. 7, 2005.

(51) Int. Cl.
*G06K 9/34* (2006.01)
(52) U.S. Cl. .................. 382/173; 382/128; 382/131

(58) Field of Classification Search ............... 382/173, 382/171, 128, 190, 131, 224, 285, 154; 435/7.1, 435/288.7; 378/21, 23, 41
See application file for complete search history.

(56) References Cited

U.S. PATENT DOCUMENTS

| | | | |
|---|---|---|---|
| 6,986,993 B1 * | 1/2006 | Ghosh et al. .............. 435/7.1 |
| 7,194,117 B2 * | 3/2007 | Kaufman et al. ............ 382/128 |
| 7,430,321 B2 * | 9/2008 | Okada et al. ............... 382/173 |
| 7,574,031 B2 * | 8/2009 | Dehmeshki ................. 382/131 |

* cited by examiner

*Primary Examiner*—Anh Hong Do

(57) ABSTRACT

A system for segmenting a target organ tumor from an image includes a background model builder, a foreground model builder and a tumor region locator. The background model builder uses an intensity distribution estimate of voxels in an organ region in an image to build a background model. The foreground model builder uses an intensity distribution estimate of voxels in a target organ tumor to build a first foreground model. The tumor region locator uses the background model and the first foreground model to segment the target organ tumor to obtain a first segmentation result.

21 Claims, 5 Drawing Sheets

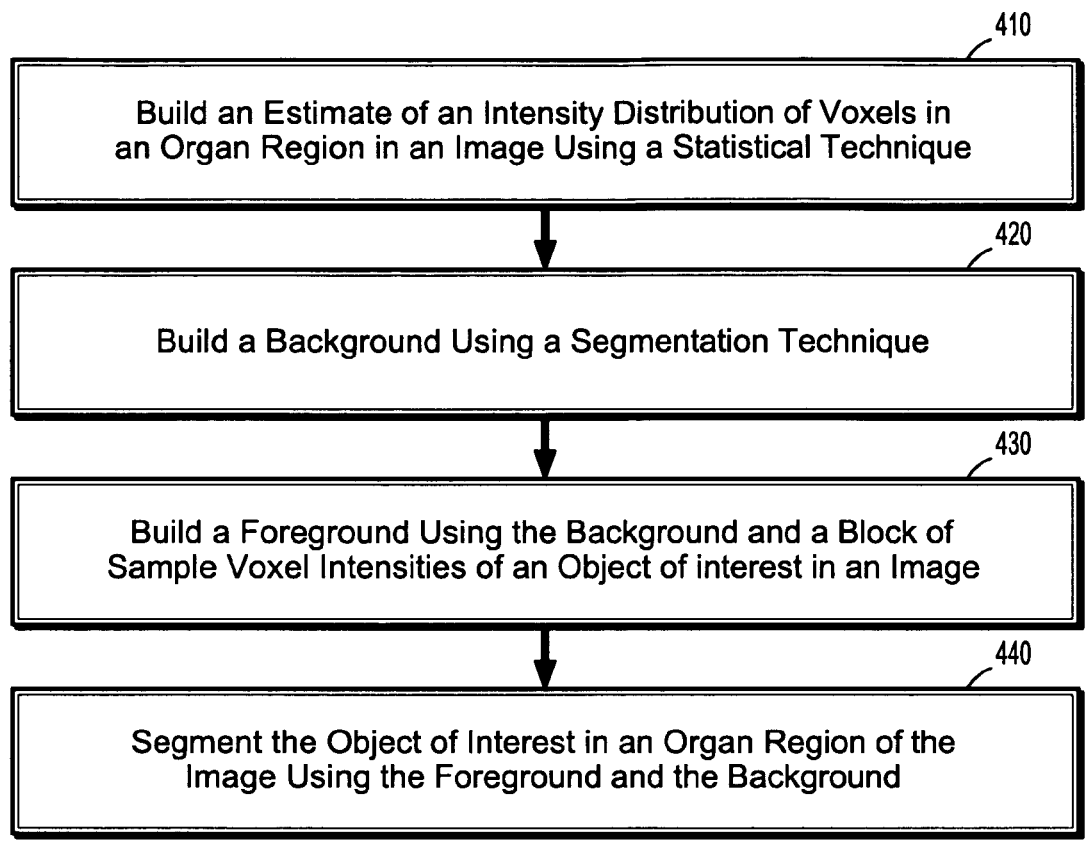
FIG. 4
   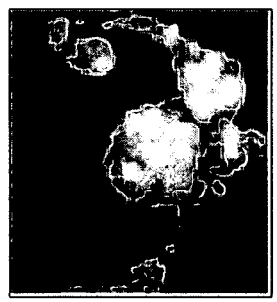      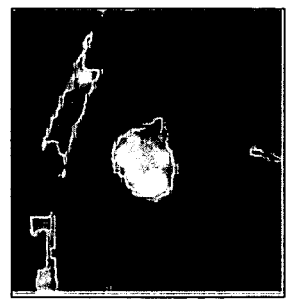
FIG. 5A     FIG. 5B     FIG. 5C     FIG. 5D

SYSTEMS AND METHODS FOR SEGMENTING OBJECT OF INTEREST FROM MEDICAL IMAGE

CROSS-REFERENCE TO RELATED APPLICATION

This application claims the benefit of U.S. Provisional Application Ser. No. 60/724,445, filed Oct. 7, 2005 and entitled "A Novel Interactive Segmentation Algorithm for Liver Tumor Assessment", the content of which is herein incorporated by reference in its entirety.

BACKGROUND OF THE INVENTION

1. Technical Field

The present disclosure relates to image processing, and more particularly to systems and methods for segmenting an object of interest from a medical image.

2. Discussion of Related Art

In recent years, medical imaging has experienced an explosive growth due to advances in imaging modalities such as X-rays, computed tomography (CT), magnetic resonance imaging (MRI) and ultrasound. Image segmentation plays an important role in computer-based medical applications for diagnosis and analysis of anatomical data by enabling automatic or semi-automatic extraction of an anatomical organ or object of interest from a dataset.

A segmentation technique to precisely and robustly label target tumor regions from three-dimensional (3-D) liver CT images, for example, may be useful in computer-aided cancer diagnosis and treatment planning such as follow-ups and computer-aided surgery planning. Liver tumors are prominent and outstanding in intensity distribution in a 3-D liver CT image. FIGS. 1A through 1D show examples of liver tumors in CT images. The two slices shown in FIGS. 1A and 1B, in which the liver tumors are indicated by arrows, are from the same liver CT scan. FIGS. 1C and 1D show an example of intensity distribution variation inside a liver tumor.

Liver tumor segmentation involves labeling all the voxels that belong to a target liver tumor in a 3-D liver CT image, such as specified by user interaction. The objectives in liver tumor segmentation include accurately locating the liver tumor regions in a 3-D liver CT image and producing consistent segmentation results that are robust to user interactions. It is not an easy task to precisely segment the liver tumor from the liver anatomy, except possibly in cases when the liver tumor is well isolated from adjacent anatomical structures.

A large number of liver tumors reside next to anatomical structures with similar intensity distribution in CT images, which may result in boundary blurriness between the liver tumors and the neighboring anatomy structures. The magnitude of gradient at the boundary points becomes much less prominent than that of the intensity variations within a liver tumor. It is very difficult to establish a criterion to identify the precise location of liver tumor boundary when such blurriness exists. Given that there are large variations in the intensity characteristics in liver CT images, neighboring anatomical structures, and intra-tumor intensity distribution, it is not easy to design a liver segmentation algorithm that produces a segmentation result that is robust to user interactions. Various liver segmentation algorithms have been proposed, some of which may perform reasonably well on liver CT images in cases when the liver is well-separated from neighboring anatomical structures and without significant boundary liver tumors. When livers are not well-separated from neighboring anatomical structures and/or there exist boundary tumors, extensive user interactions are needed.

Liver tumor segmentation may be handled as a modified region-growing problem, which in most cases does not produce an acceptable segmentation result, Moreover, this approach requires extensive user editing, which is not desirable in tumor segmentation. The graph cut algorithm has been tried for tumor segmentation. The graph cut algorithm uses seed points provided by a user to establish a graph representing the foreground and background relationship. It segments the foreground and background by calculating the min-cut. This technique may work reasonably well on some isolated tumors, but does not handle the blurred boundary cases. The random walk algorithm has been tried for tumor segmentation. This technique enables more informative constraints to be incorporated in the segmentation algorithm but does not handle the blurred boundary cases, and it requires a significant amount of user interactions, which is not desirable in 3-D tumor segmentation.

SUMMARY OF THE INVENTION

According to an exemplary embodiment of the present invention, a system is provided for segmenting a target organ tumor from an image. The system includes: a background model builder, wherein the background model builder uses an intensity distribution estimate of voxels in an organ region in an image to build a background model; a foreground model builder, wherein the foreground model builder uses an intensity distribution estimate of voxels in a target organ tumor to build a first foreground model; and a tumor region locator, wherein the tumor region locator uses the background model and the first foreground model to segment the target organ tumor to obtain a first segmentation result.

According to an exemplary embodiment of the present invention, a method is provided for segmenting an object of interest from a medical image. The method includes: building a background using a segmentation technique; building a foreground using the background and a block of sample voxel intensities of an object of interest in an image; and segmenting the object of interest in an organ region of the image using the foreground and the background.

According to an exemplary embodiment of the present invention, a system for providing segmentation of an object of interest from a medical image comprises: a memory device for storing a program; a processor in communication with the memory device, the processor operative with the program to: build a background using a segmentation technique; build a foreground using the background and a block of sample voxel intensities of an object of interest in an image; and segment the object of interest in an organ region of the image using the foreground and the background.

BRIEF DESCRIPTION OF THE DRAWINGS

The present invention will become more apparent to those of ordinary skill in the art when descriptions of exemplary embodiments thereof are read with reference to the accompanying drawings.

FIG. 4 is a flowchart showing a method of segmenting an object of interest from a medical image, according to an exemplary embodiment of the present invention, FIGS. 5A through 5D show examples of the estimated likelihood fields of liver tumors, according to an exemplary embodiment of the present invention.

DESCRIPTION OF EXEMPLARY EMBODIMENTS

Hereinafter, exemplary embodiments of the present invention will be described in detail with reference to the accompanying drawings.

Figure 1A:
FIGS. 1A through 1D show examples of liver tumors in CT images.
Figure 1B:
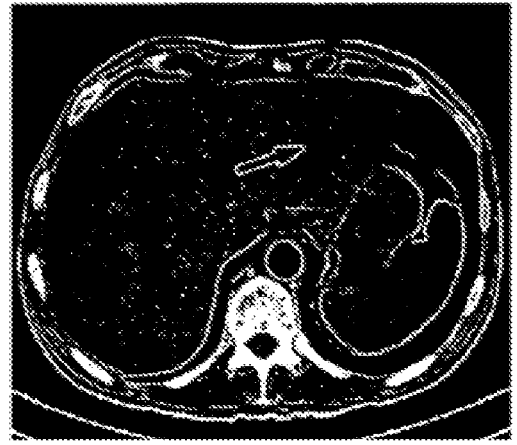
Figure 1C:
Figure 1D:
Figure 2:
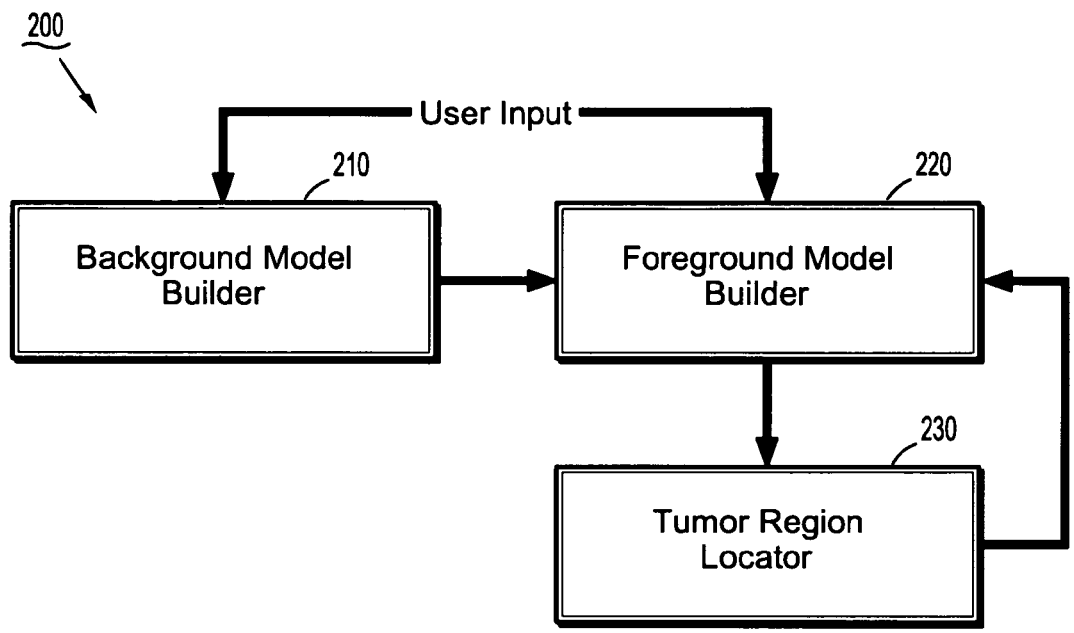
FIG. 2 shows a block diagram of system for segmenting a target organ tumor from an image, according to an exemplary embodiment of the present invention.

FIG. 2 shows a block diagram of system for segmenting a target organ tumor from an image, according to an exemplary embodiment of the present invention. Images may be obtained using one or more imaging modalities. Examples of images include X-ray images, positron emission tomography (PET) images, computed tomography (CT) images, magnetic resonance imaging (MRI) images, single-photon emission computed tomography (SPECT) images, etc. An image may comprise 2-D image data, 3-D image data and/or higher-dimensional image data. As used herein, "organ" refers to cells, tissues, organs and/or organ systems. Examples of organs include a liver, a pancreas, a lung or a kidney Referring to FIG. 2, the tumor segmentation system 200 comprises a background model builder 210, a foreground model builder 220, and a tumor region locator 230. In an exemplary embodiment of the present invention, the background model builder estimates an intensity distribution of voxels in an organ region in an image to build a background model, the foreground model builder estimates an intensity distribution of voxels in a target organ tumor to build a first foreground model, and the tumor region locator uses the background model and the first foreground model to segment the target organ tumor to obtain a first segmentation result.

The background model builder 210 estimates the intensity distribution of voxels in organ regions from the samples provided by user interactions The samples may be two or three small sampling blocks at, for example, liver regions. The background model builder 210 marks the liver regions in the input 3D liver CT image based on the estimated intensity distribution. In addition, marking the liver regions in the input 3D liver CT image may include a number of heuristic-based steps, such as for example, morphological operations, connect component analysis, and convex hull analysis on the extracted liver boundaries at each 2D slice. A background model includes the estimated intensity distribution estimate in the liver regions and the liver regions.

The foreground model builder 220 estimates the intensity distribution of voxels in a target liver tumor using a set of samples, which initially comprises user interactive inputs or may comprise the segmentation outputs from the tumor region locator 230. The foreground model builder 220 may use the Bayesian rule to build a likelihood field of the target tumor using the background model established previously and the intensity distribution of voxels in the target liver tumor.

The tumor region locator 230 starts from the position initially provided by user interactions to identify substantially all the voxels that belong to the target liver tumor. It segments the target liver tumor using, for example, the likelihood field with a boundary-based constraint, The output of the identified liver tumor regions can be fed to the foreground model builder 220 to establish a more reliable 3D likelihood field, which can then be fed to the liver tumor region locator 230 to obtain a more accurate segmentation. The two stages can iterate a number of times to produce a reliable segmentation, For example, two iterations may be sufficient to produce a reliable segmentation result.

Background Model Builder

Equation 1, below, denotes a 3D liver CT image, where X, Y, and Z are the x-, y-, and z-dimensions of the liver CT image, respectively.

$$F=\{F(x,y,z)|0 \le x<X, 0 \le y<Y, 0 \le z<Z\} \quad (1)$$

A voxel, F(x,y,z), is said to be a liver voxel if F(x,y,z) is in a liver region, which is represented by label $C_0$. A voxel, F(x,y,z), is said to be a liver tumor voxel if F(x,y,z) is in a liver tumor, which is represented by label $C_1$. Let $S=\{F(x_1,y_1,z_1), F(x_2,y_2,z_2), \ldots, F(x_n,y_n,z_n)\}$ be a set of samples of size n in liver regions provided by user interactions. Assuming the set of samples is representative, a nonparametric Parzen window technique can be used to obtain an estimate of the intensity distribution of voxels in liver regions. For example, the nonparametric Parzen window technique can be expressed by Equation 2.

$$p(l|C_0) = \frac{1}{n}\sum_{i=1}^{n}\frac{1}{V_n}h\left(\frac{(l-F(x_i,y_i,z_i))}{h_n}\right), \quad (2)$$

where h( ) is a kernel function; $V_n$ is the volume of the kernel function; $h_n$ is the window size. The Gaussian kernel with a std value of 10, for example, may be used.

According to an exemplary embodiment of the present invention, a voxel, F(x,y,z), is labeled as a liver voxel if $$p(F(x,y,z)|C_0) \ge \beta, \quad (3)$$

where β is a user-specified threshold value. A discrimination function based on sample intensity distribution may result in a significant amount of classification errors of two types: (i) liver voxels being misclassified as non-liver voxels and (ii) non-liver voxels being classified as liver voxels. The majority of liver voxels in liver regions may be correctly classified. The correctly classified liver voxels form a number of large connected components that are a collection of voxels with each voxel being directly or indirectly connected to all each voxels. Voxels in non-liver regions that are correctly classified as non-liver voxels also form a set of large connected components.

Morphological operations as well as connected component analysis may be used to clean the classification errors. In addition to morphological operations and connected component analysis, a number of heuristic-based steps may also be used to refine the segmentation results, including the convex property of the left liver boundary at each slice, removing voxels of very high intensity value in ribs, and removing voxels of very low intensity in certain organs. After liver regions are located, at each slice, convex hull analysis may be applied to regulate the shape of liver boundary. A liver segmentation mask, M, can be expressed by Equation 4.

$$M(x, y, z) = \begin{cases} 1, & \text{if } F(x, y, z) \text{ is a liver voxel,} \\ 0, & \text{Otherwise.} \end{cases} \quad (4)$$

Figure 3A:
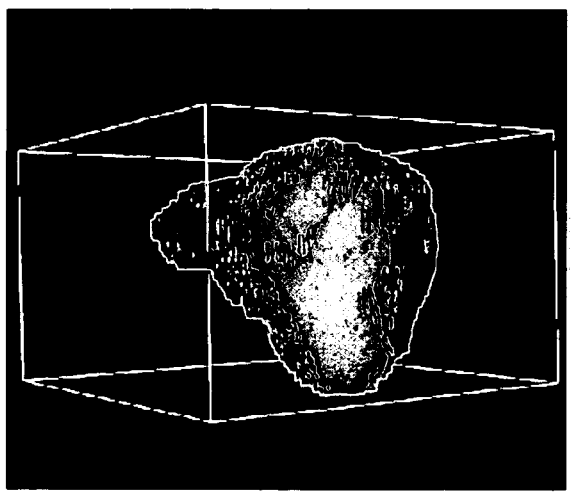
FIGS. 3A and 3B show examples of a labeled liver region, according to an exemplary embodiment of the present invention.
Figure 3B:
Figure 6A:
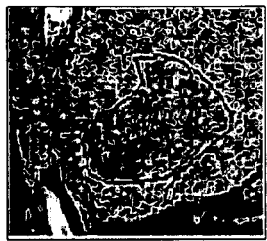
FIGS. 6A through 6H show examples of the 2D liver tumor boundary of three liver tumors, which were marked by physicians.
Figure 6B:
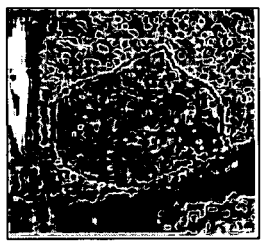
Figure 6C:
Figure 6D:
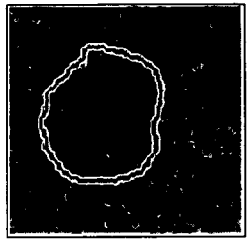
Figure 6E:
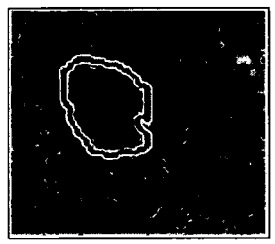
Figure 6F:
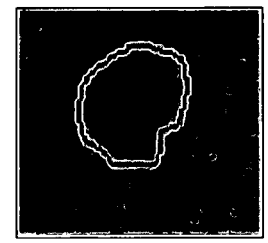
Figure 6G:
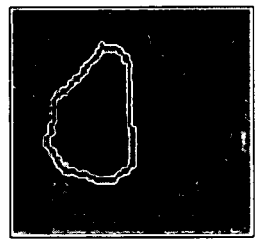
Figure 6H:
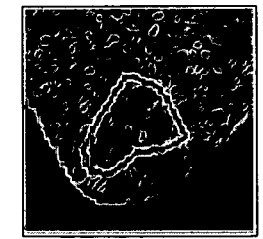

FIGS. 3A and 3B show examples of a labeled liver region, according to an exemplary embodiment of the present invention. FIG. 3A shows the 3D rendering of the segmented liver, and FIG. 3B shows the boundary of a segmented liver region in a slice; In an exemplary embodiment of the present invention, the segmented liver boundary is used to constraint the liver tumor segmentation.

For example, let $\Omega = \{F(x,y,z) | M(x,y,z)=1\}$ be the set of voxels of size $m=|\Omega|$ in liver regions identified in the process described above. A refined liver intensity distribution can be obtained using Equation 5.

$$p'(l|C_0) = \frac{1}{m} \sum_{M(x,y,z)=1} \frac{1}{V_m} h\left(\frac{(l-F(x,y,z))}{h_m}\right), \quad (5)$$

where $h(\ )$ (Gaussian) is a kernel function; $V_m$ $(=1)$ is the volume of the kernel function; $h_m$ $(=10)$ is the window size, based on which, a 3D liver probability field of the same dimension as F can be obtained using Equation 6.

$$f(x, y, z | C_0) = W \sum_{(x',y',z') \in N} \exp\left(\frac{-ap'(F(x', y', z') | C_0)}{(x'-x)^2 + (y'-y)^2 + (z'-z)^2}\right), \quad (6)$$

where N defines a small local neighborhood around (x,y,z); a and W are weighting factors, respectively. For example, N may be defined as a 5×5×1 local window, a 7×7×1 local window or window of other size. For example, the window size of N in the z axis may be 1 when the liver CT images have a low resolution in the z axis, for example, about 5.0 mm. The weighting factor a may be equal to about 3.0, and W takes a value that scales the target field in a proper range.

In an exemplary embodiment of the present invention, the background model builder receives user input marking one or more sample organ regions in the image, and the background model builder uses the sample organ regions for estimating the intensity distribution of voxels in the organ region in the image. The background model builder may mark organ regions in the image based on the estimated intensity distribution of voxels in the organ region and based on morphological operations, connected component analysis and/or convex hull analysis.

Foreground Model Builder

For example, let $T = \{F(x_1,y_1,z_1), F(x_2,y_2,z_2), \ldots, F(x_t,y_t,z_t)\}$ be the set of liver tumor samples of size t provided by user interactions. The intensity distribution of voxels in the target liver tumor can be estimated as:

$$p'(l|C_1) = \frac{1}{t} \sum_{i=1}^{t} \frac{1}{V_t} h\left(\frac{(l-F(x_i, y_i, z_i))}{h_t}\right), \quad (7)$$

where kernel t, volume $V_t$, and window size $h_m$ are defined the same as the above, respectively. Based on this estimated intensity distribution, a probability field of the target liver tumor can be estimated according to Equation 8.

$$f(x, y, z | C_1) = W \sum_{(x',y',z') \in N} \exp\left(\frac{-ap(F(x', y', z') | C_1)}{(x'-x)^2 + (y'-y)^2 + (z'-z)^2}\right), \quad (8)$$

where N, a, and W are defined the same as that of liver regions.

Without a lose of generality, each voxel can be assumed to have an equal probability to be a liver voxel or a liver tumor voxel. Using the Bayesian rule, a likelihood field of the target liver tumor can be calculated as expressed by Equation 9.

$$L(x, y, z) = \frac{f(x, y, z | C_1)}{f(x, y, z | C_0)} \quad (9)$$

FIGS. 5A through 5D show examples of the estimated likelihood fields of liver tumors, according to an exemplary embodiment of the present invention. FIGS. 5A and 5B show the raw image slices, and FIGS. 5C and 5D are the corresponding likelihood field slices.

In an exemplary embodiment of the present invention, the foreground model builder receives user input marking a target organ tumor in the image, and the foreground model builder uses the user input for estimating the intensity distribution of voxels in the target organ tumor. The foreground model builder may use a Bayesian rule to build a likelihood field of the target organ tumor using the background model and the estimated intensity distribution of voxels in the target organ tumor.

Tumor Region Locator

Given the likelihood field, a voxel, (x,y,z), can be classified as a liver tumor voxel if Equation 10 is satisfied for the value of $\lambda$.

$$L(x,y,z) \geq \lambda, \quad (10)$$

where $\lambda$ is a pre-defined likelihood threshold value which determines the confidence of (x,y,z) being a foreground liver tumor voxel. The discriminating function may produce a segmentation result that includes misclassified voxels, as shown in FIG. 5B, in cases when the target liver tumor is next to anatomical structures with an intensity distribution similar to the target liver tumor. A restriction on the segmentation result can be used to reduce or eliminate the misclassified non-target voxels in the segmentation. In order to impose restrictions on the segmentation result, additional information may be used. For example, the shape feature can be used in regulating segmentation results. FIGS. 6A through 6H show examples of the 2D liver tumor boundary of three liver tumors, which were marked by physicians.

In an exemplary embodiment of the present invention, the tumor region locator starts from a user-input position in the image to locate substantially all voxels in the target organ tumor. The tumor region locator uses the background model and the second foreground model to segment the target organ tumor to obtain a second segmentation result. The tumor region locator may segment the target organ tumor using a likelihood field of the target organ tumor. In an exemplary embodiment of the present invention, the foreground model builder uses the first segmentation result to build a second foreground model.

Hereinafter, a method of segmenting an object of interest from a medical image will be described with reference to FIG. 4. Medical images may be obtained using one or more imaging modalities. Examples of medical images include X-ray images, positron emission tomography (PET) images, computed tomography (CT) images, magnetic resonance imaging (MRI) images, single-photon emission computed tomography (SPECT) images, etc. A medical image may comprise 2-D image data, 3-D image data and/or higher-dimensional image data.

2-D image data, 3-D image data and/or higher-dimensional image data.

FIG. 4 is a flowchart showing a method of segmenting an object of interest from a medical image, according to an exemplary embodiment of the present invention. Referring to FIG. 4, in step 410, build an estimate of an intensity distribution of voxels in the organ region using a statistical technique. The statistical technique may be a nonparametric Parzen window technique, a histogram, a density estimation technique, a Gaussian model, etc.

In step 420, build a background using a segmentation technique. The segmentation technique may be an organ segmentation technique.

Segmentation Technique.

In step 430, build a foreground using a block of sample voxel intensities of the background and a block of sample voxel intensities of an object of interest in an image. The block of sample voxel intensities of the background may comprise a small block of sample voxel intensities of the background. The block of sample voxel intensities of the object of interest in the image may comprise a small block of sample voxel intensities. For example, a small block of sample voxel intensities may be a 7×7×1 block, 5×5×1 block, or other small block configurations of sample voxel intensities.

The step 430 of building the background may comprise receiving user input marking one or more samples from an organ region in an image. The organ region may be a liver region, a pancreas region, a kidney region, a lung region, or other organ region.

In step 440, segment the object of interest in an organ region of the image using the foreground and the background. The organ segmentation technique may comprise classifying voxels as organ or non-organ using an estimate of an intensity distribution of voxels in an organ region of the image. Morphological operations, connected component analysis, or convex hull analysis may be used to reduce classification errors.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 7:
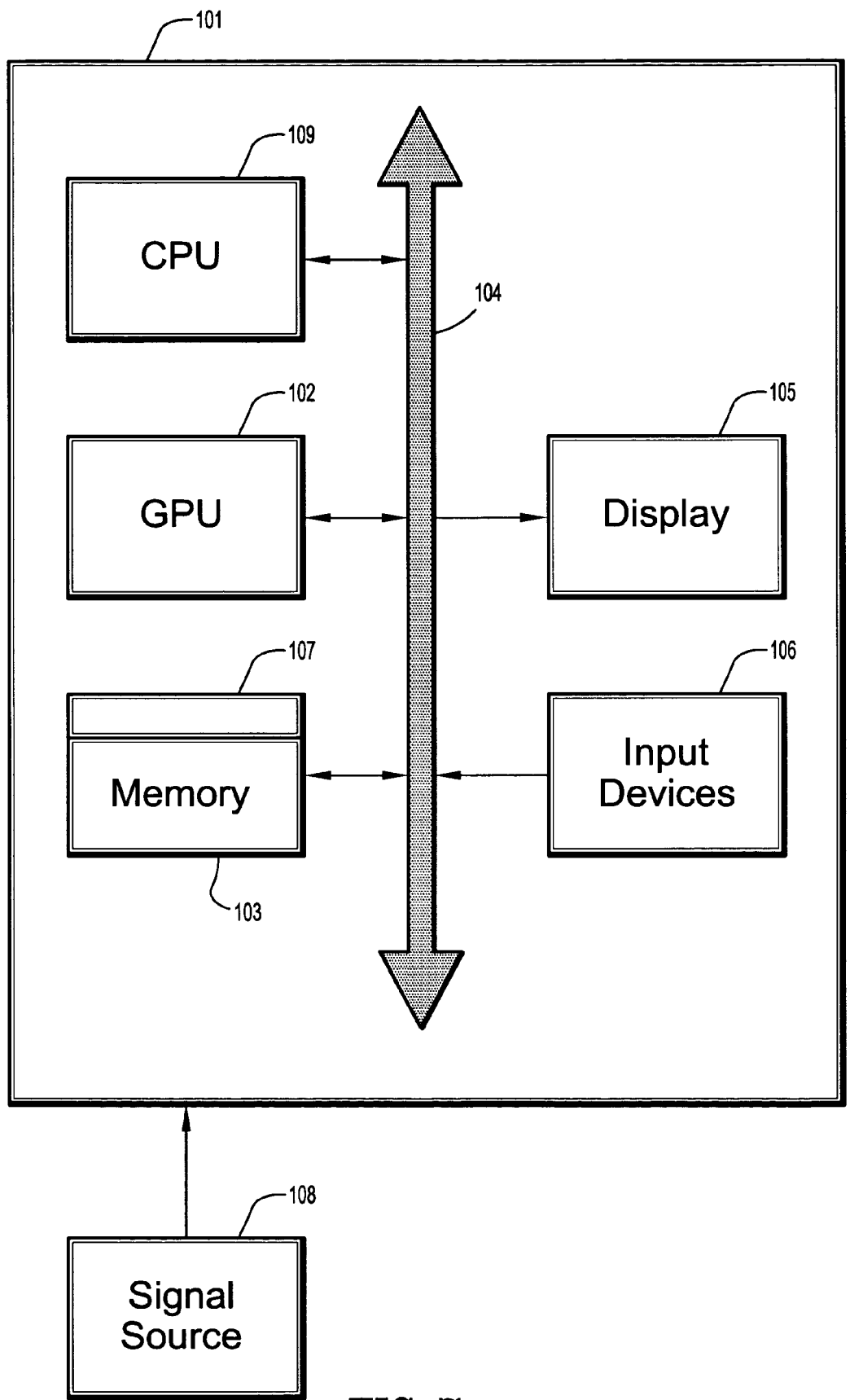
FIG. 7 illustrates a computer system for implementing a method of segmenting an object of interest from a medical image, according to an exemplary embodiment of the present invention.

Referring to FIG. 7, according to an embodiment of the present disclosure, a computer system 101 for implementing a method of image segmentation can comprise, inter alia, a central processing unit (CPU) 109, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 109 to process the signal from the signal source 108. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

In an exemplary embodiment of the present invention, a system for providing segmentation of an object of interest from a medical image comprises a memory device 103 for storing a program, and a processor 109 in communication with the memory device 103. The processor 109 is operative with the program to build a background using a segmentation technique; build a foreground using the background and a block of sample voxel intensities of an object of interest in an image; and segment the object of interest in an organ region of the image using the foreground and the background. The segmentation technique may be an organ segmentation technique.

When building the background, the processor 109 may be operative with the program to receive user input marking one or more samples from an organ region in an image. When segmenting the object of interest, the processor 109 may be operative with the program to classify voxels as organ or non-organ using an estimate of an intensity distribution of voxels in an organ region of the image.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

In an exemplary embodiment of the present invention, a method of segmenting an object of interest from an image is based on the likelihood field of intensity distribution of liver regions and includes one or more heuristic-based analysis steps. Examples of heuristic-based analysis steps include morphological operations, connected component analysis or convex hull analysis. Exemplary embodiments of the present invention may obtain a segmentation that is substantially accurate at major regions of a target liver even though the target liver may not be well-separated from neighboring anatomy structures and/or there exist boundary liver tumors. In an exemplary embodiment of the present invention, a method of segmenting a liver tumor from an image is able to accurately and consistently locate liver tumor regions with very limited user interactions.

Although the processes and apparatus of the present invention have been described in detail with reference to the accompanying drawings for the purpose of illustration, it is to be understood that the inventive processes and apparatus are not to be construed as limited thereby. It will be readily apparent to those of reasonable skill in the art that various modifications to the foregoing exemplary embodiments may be made without departing from the spirit and scope of the invention as defined by the appended claims.

What is claimed is:

1. A system for segmenting a target organ tumor from an image, comprising:
   a background model builder, wherein the background model builder uses an intensity distribution estimate of voxels in an organ region in an image to build a background model;
   a foreground model builder, wherein the foreground model builder uses an intensity distribution estimate of voxels in a target organ tumor to build a first foreground model; and
   a tumor region locator, wherein the tumor region locator uses the background model and the first foreground model to segment the target organ tumor to obtain a first segmentation result.

2. The system of claim 1, wherein the background model builder receives user input marking one or more sample organ regions in the image, and wherein the background model builder uses the sample organ regions for estimating the intensity distribution of voxels in the organ region in the image.

3. The system of claim 1, wherein the background model builder marks organ regions in the image based on the estimated intensity distribution of voxels in the organ region and based on at least one of morphological operations, connected component analysis or convex hull analysis.

4. The system of claim 1, wherein the foreground model builder receives user input marking a target organ tumor in the image, and wherein the foreground model builder uses the user input for estimating the intensity distribution of voxels in the target organ tumor.

5. The system of claim 1, wherein the foreground model builder uses a Bayesian rule to build a likelihood field of the target organ tumor using the background model and the estimated intensity distribution of voxels in the target organ tumor.

6. The system of claim 1, wherein the tumor region locator starts from a user-input position in the image to locate substantially all voxels in the target organ tumor.

7. The system of claim 1, wherein the tumor region locator segments the target organ tumor using a likelihood field of the target organ tumor.

8. The system of claim 1, wherein the foreground model builder uses the first segmentation result to build a second foreground model.

9. The system of claim 8, wherein the tumor region locator uses the background model and the second foreground model to segment the target organ tumor to obtain a second segmentation result.

10. The system of claim 1, wherein the organ region is one of a liver region, a pancreas region, a kidney region or a lung region.

11. A computer readable medium embodying instructions executed by a processor to perform a method of segmenting an object of interest from a medical image, the method comprising:
   building a background using a segmentation technique;
   building a foreground using the background and a block of sample voxel intensities of an object of interest in an image; and
   segmenting the object of interest in an organ region of the image using the foreground and the background.

12. The computer readable medium of claim 11, wherein building the background comprises receiving user input marking one or more samples from an organ region in an image.

13. The computer readable medium of claim 11, wherein the segmentation technique is an organ segmentation technique.

14. The computer readable medium of claim 13, wherein the organ segmentation technique comprises classifying voxels as organ or non-organ using an estimate of an intensity distribution of voxels in an organ region of the image.

15. The computer readable medium of claim 14, wherein at least one of morphological operations, connected component analysis, or convex hull analysis is used to reduce classification errors.

16. The computer readable medium of claim 11, the method further comprising building an estimate of an intensity distribution of voxels in the organ region using a statistical technique.

17. The computer readable medium of claim 16, wherein the statistical technique is one of a nonparametric Parzen window technique, a histogram, a density estimation technique, or a Gaussian model.

18. The computer readable medium of claim 11, wherein the block of sample voxel intensities comprises a small block of sample voxel intensities.

19. A system for providing segmentation of an object of interest from a medical image, comprising:
   a memory device for storing a program;
   a processor in communication with the memory device, the processor operative with the program to:
      build a background using a segmentation technique;
      build a foreground using the background and a block of sample voxel intensities of an object of interest in an image; and
      segment the object of interest in an organ region of the image using the foreground and the background.

20. The system of claim 19, wherein when building the background, the processor is further operative with the program to receive user input marking one or more samples from an organ region in an image.

21. The system of claim 19, wherein when segmenting the object of interest the processor is further operative with the program to classify voxels as organ or non-organ using an estimate of an intensity distribution of voxels in an organ region of the image.

* * * * *